United States Patent [19]
Ichikawa et al.

[11] Patent Number: 6,054,503
[45] Date of Patent: Apr. 25, 2000

[54] PLASTIC LENS MATERIAL AND PROCESS FOR PREPARING THE SAME

[75] Inventors: Yukio Ichikawa; Teruo Sakagami, both of Iwaki, Japan

[73] Assignee: Kureha Kagaku Kogyo Kabushiki Kaisha, Tokyo, Japan

[21] Appl. No.: 09/202,085

[22] PCT Filed: Jun. 17, 1997

[86] PCT No.: PCT/JP97/02079

§ 371 Date: Dec. 8, 1998

§ 102(e) Date: Dec. 8, 1998

[87] PCT Pub. No.: WO97/48745

PCT Pub. Date: Dec. 24, 1997

[30] Foreign Application Priority Data

Jun. 17, 1996 [JP] Japan ................................ 8-155215

[51] Int. Cl.⁷ .................................................. C08G 18/67
[52] U.S. Cl. ................................ 522/96; 528/79; 528/73; 523/106; 526/301; 351/159
[58] Field of Search .......................... 528/49, 73; 522/96; 526/301; 523/106; 351/159

[56] References Cited

U.S. PATENT DOCUMENTS 5,416,880  5/1995  Edwards et al. ........................ 385/128
5,880,171  3/1999  Lim et al. ............................... 523/106

FOREIGN PATENT DOCUMENTS 3-296513  12/1991  Japan .
4-77514   3/1992   Japan .
6-234829  8/1994   Japan .

Primary Examiner—Rachel Gorr
Attorney, Agent, or Firm—Frishauf, Holtz, Goodman, Langer & Chick, P.C.

[57] ABSTRACT

Disclosed herein are a plastic lens material having both excellent optical and mechanical properties and having a low specific gravity, and a production process for producing the plastic lens material having excellent various properties and a low specific gravity. The plastic lens material comprises a copolymer obtained by radical-polymerizing a reaction product of a component [A] containing a polyhydric alcohol obtained by subjecting a dimer and/or a trimer of a higher unsaturated fatty acid having 11 to 22 carbon atoms with a component [B] containing an isocyanate compound having a radical-polymerizable unsaturated bond in its molecule together with a copolymerizable monomer [C].

20 Claims, No Drawings

PLASTIC LENS MATERIAL AND PROCESS FOR PREPARING THE SAME

TECHNICAL FIELD

The present invention relates to plastic lens materials and a production process thereof, and more particularly to plastic lens materials from which optical lenses having excellent optical properties and mechanical properties as well as a low specific gravity can be formed, and a production process thereof.

BACKGROUND ART

Plastic materials have begun being widely used as recent materials for optical lenses from the viewpoints of light-weight property, processability, stability, dyeability, high-volume production capability, reducibility in cost, etc.

Among various properties required of materials for optical lenses, it is extremely important for them to have a low specific gravity. More specifically, if an optical lens formed of a material low in specific gravity is obtained, the use of such a lens permits reduction in the weight of a lens system, which occupies an important position in optical instruments, for example, microscopes, cameras and telescopes, and spectacle lenses.

Even in plastic lens materials, therefore, there is a tendency to attempt making their specific gravity further lower so as to stress predominance over materials for inorganic glass lenses.

For example, a diethylene glycol bisallyl carbonate resin designated "CR-39" is known as a plastic material for spectacle lenses spreading widest at present. However, the specific gravity of this resin is as comparatively high as 1.31 (in terms of a value measured at 20° C.; the same shall apply to the following).

Besides, plastic lens materials containing halogen atoms or sulfur atoms have recently been known as materials for high-refractive index lenses. However, such plastic lens materials also have a specific gravity as comparatively high as about 1.3 to 1.4.

Further, thermoplastic resins such as polystyrene (specific gravity: 1.02), polymethyl methacrylate (specific gravity: 1.20) and polycarbonate (specific gravity: 1.19) have been known as plastic lens materials having a comparatively low specific gravity. However, these thermoplastic resins do not have sufficient optical properties required from the viewpoint of practical use.

On the other hand, copolymers having a crosslinked structure have been introduced as plastic lens materials excellent in various performance characteristics such as heat resistance, solvent resistance and mechanical strength. For example, "NIKON LIGHT DELUXE II" and the like have been put to practical use as plastic lens materials having a triazine ring structure. The specific gravity of the plastic lens material is as comparatively low as 1.17. However, this plastic lens material cannot be yet said to be satisfactory for more reducing the weight of plastic lenses.

DISCLOSURE OF THE INVENTION

The present invention has been made on the basis of the foregoing circumstances and has as its object the provision of a plastic lens material having both excellent optical and mechanical properties and moreover having a low specific gravity.

Another object of the present invention is to provide a process for producing a plastic lens material having various excellent properties and a low specific gravity.

The present inventors have carried out an extensive investigation with a view toward achieving the above objects. As a result, it has been found that when a reaction product obtained by subjecting a polyhydric alcohol, which is obtained by subjecting a dimer and/or a trimer of a specific higher unsaturated fatty acid to a reducing treatment, and an isocyanate compound having a radical-polymerizable unsaturated bond in its molecule to a urethanation reaction is radical-polymerized together with a monomer copolymerizable with the reaction product, a copolymer suitable for use as a lens material having a low specific gravity, excellent transparency and a high refractive index is obtained. The present invention has been led to completion on the basis of such a finding.

Namely, a plastic lens material according to the present invention comprises a copolymer obtained by polymerizing a monomer mixture comprising 20 to 80 mass % of a reaction product (hereinafter may also be referred to as "radical-polymerizable urethane compound") obtained by subjecting the following component [A] and the following component [B] to a urethanation reaction in proportions that a ratio (b/a) of the number (b) of moles of an isocyanate group contained in the component [B] to the number (a) of moles of hydroxyl groups contained in the component [A] amounts to 0.5 to 3.0, and 80 to 20 mass % of a monomer (hereinafter may also referred to as "copolymerizable monomer [C]") copolymerizable with the reaction product.

Besides, a process according to the present invention for producing the plastic lens material comprises subjecting the following component [A] and the following component [B] to a urethanation reaction in proportions that a ratio (b/a) of the number (b) of moles of an isocyanate group contained in the component [B] to the number (a) of moles of hydroxyl groups contained in the component [A] amounts to 0.5 to 3.0 to obtain a reaction product, mixing 20 to 80 mass % of the thus-obtained reaction product with 80 to 20 mass % of a monomer copolymerizable with the reaction product to prepare a monomer mixture, and radical-polymerizing the monomer mixture.

Component [A]:

a polyhydric alcohol-containing component composed of 60 to 100 mass % of at least one polyhydric alcohol selected from the following component $A^1$ and the following component $A^2$, and 40 to 0 mass % of at least one compound selected from the following component $A^3$ and the following component $A^4$;

(1) Component $A^1$: at least one diol selected from a dimer diol obtained by subjecting a dimer (hereinafter may also referred to as "dimer acid") of a higher unsaturated fatty acid having 11 to 22 carbon atoms to a reducing treatment, and a dimer diol obtained by subjecting a dimer of a lower alcohol ester (hereinafter may also referred to as "dimer acid diester") of a higher unsaturated fatty acid having 11 to 22 carbon atoms to a reducing treatment;

(2) Component $A^2$: at least one triol selected from a trimer triol obtained by subjecting a trimer (hereinafter may also referred to as "trimer acid") of a higher unsaturated fatty acid having 11 to 22 carbon atoms to a reducing treatment, and a trimer triol obtained by subjecting a trimer of a lower alcohol ester (hereinafter may also referred to as "trimer acid triester") of a higher unsaturated fatty acid having 11 to 22 carbon atoms to a reducing treatment;

(3) Component $A^3$: an ether compound obtained by an intermolecular dehydration reaction of at least one polyhydric alcohol selected from the component $A^1$ and the component $A^2$;

(4) Component $A^4$: an ester compound obtained by reacting at least one polyhydric alcohol selected from the component $A^1$ and the component $A^2$ with a carboxylic acid corresponding to the polyhydric alcohol; and Component [B]:

an isocyanate compound-containing component composed of 50 to 100 mass % of an isocyanate compound $B^1$ having a radical-polymerizable unsaturated bond in its molecule and 50 to 0 mass % of a polyisocyanate compound $B^2$ having no radical-polymerizable unsaturated bond in its molecule.

The present invention will hereinafter be described in detail.

<Component [A]>

The component [A] used for obtaining a plastic lens material according to the present invention is a component containing at least one polyhydric alcohol selected from a group consisting of the component $A^1$ (dimer diol) and the component $A^2$ (trimer triol) as an essential component and including at least one compound selected from a group consisting of the component $A^3$ (ether compound) and the component $A^4$ (ester compound) as an optional component.

As higher unsaturated fatty acids used as raw materials for the dimer acid and dimer acid diester which are precursors of the dimer diols, and for the trimer acid and trimer acid triester which are precursors of the trimer triols, there may be used those having 1 to 4, preferably 1 or 2 unsaturated bonds (double bonds) and 11 to 22, preferably 14 to 20, more preferably 16 to 18 carbon atoms. If the number of carbon atoms of the higher unsaturated fatty acid is less than 11, it is difficult to obtain a lens material having a low specific gravity. If the number of carbon atoms exceeds 22 on the other hand, it is difficult to obtain a lens material having excellent mechanical properties because of reduction in density of crosslinking, and the like.

Specific examples of such higher unsaturated fatty acids include oleic acid, elaidic acid, octadecenic acid, linolic acid, palmitoleic acid, myristoleic acid, linolenic acid, isooleic acid, eicosenoic acid, docosenic acid, branched chain octadecenic acid, branched chain hexadecenic acid and undecylenic acid. These higher unsaturated fatty acids may be used either singly or in any combination thereof.

As the lower alcohol ester of the higher unsaturated fatty acid (hereinafter may also referred to as "higher unsaturated fatty acid ester" merely), there may be used an ester of any of the above-mentioned higher unsaturated fatty acids with a lower aliphatic alcohol having 1 to 6, preferably 1 to 4 carbon atoms. Examples thereof include methyl esters, ethyl esters, propyl esters and butyl esters of the fatty acids. These higher unsaturated fatty acid esters may be used either singly or in any combination thereof.

As examples of reaction catalysts usable for dimerization or trimerization of the higher unsaturated fatty acid and higher unsaturated fatty acid ester, may be mentioned liquid or solid Lewis acids and Brønsted acids. Specific examples thereof include various activated clays such as montmorillonite type activated clay and bentonite type activated clay, synthetic zeolites, silica-alumina, and silica-magnesia. The use of the montmorillonite type activated clay is particularly preferred. The amount of such a reaction catalyst to be added is 1 to 20 mass %, preferably 2 to 8 mass %, based on the raw material. The reaction temperature is 200 to 270° C., preferably 220 to 250° C., while the reaction pressure is atmospheric pressure or a pressure somewhat higher than atmospheric pressure, and specifically is 1 to 10 atm. The reaction time is generally 5 to 7 hours though it may be varied according to the amount of the catalyst and the reaction temperature. This reaction tends to increase the viscosity of the reaction system as the reaction is allowed to progress. After completion of the reaction, the reaction catalyst is separated by filtration from the reaction mixture, and the reaction mixture is then subjected to, for example, vacuum distillation, thereby distilling out an unreacted raw material and by-products such as branched chain fatty acids. Thereafter, a dimer can be distilled out, and the distillation can be further continued to distill out a trimer. When the higher unsaturated fatty acid is used as a raw material in the above reaction, a dimer acid having 2 carboxyl groups and a trimer acid having 3 carboxyl groups are provided as the dimer and the trimer, respectively. On the other hand, when the higher unsaturated fatty acid ester is used as a raw material, a dimer acid diester having 2 ester groups and a trimer acid triester having 3 ester groups are provided as the dimer and the trimer, respectively.

The thus-obtained dimers (dimer acid and dimer acid diester) are subjected to a reducing treatment (hydrogenation), thereby obtaining dimer diols as the component $A^1$, while the trimers (trimer acid and trimer acid triester) are subjected to a reducing treatment, thereby obtaining trimer triols as the component $A^2$.

As a process for subjecting the dimers and trimers to the reducing treatment, there may be used any known chemical reduction process, for example, a reduction process making use of a hydrogenating agent such as lithium aluminum hydride ($LiAlH_4$), lithium borohydride ($LiBH_4$) or a metallic sodium/alcohol system.

The reduction process will be described specifically. Lithium aluminum hydride is dispersed in a solvent such as diethyl ether or dioxane in such a manner that the molar ratio of the lithium aluminum hydride is 2 times the dimer component or 3 times the trimer component. The dimer component (dimer acid and/or dimer acid diester) and/or the trimer component (trimer acid and/or trimer acid triester) diluted with diethyl ether is gradually added dropwise to this dispersion over 1 to 2 hours at 0° C. to room temperature, thereby conducting a reaction. After completion of the addition, the reaction mixture is stirred at room temperature for about 30 minutes, and water is then gradually added dropwise in an amount about 4 times, in terms of molar ratio, of the lithium aluminum hydride added, thereby terminating the reaction. Dilute sulfuric acid is then added to the reaction mixture in an amount of about 10 mass % based on the reaction mixture to remove lithium and aluminum from the solvent layer. The solvent layer is washed with water until waste water becomes neutral. The solvent in the solvent layer is then removed, thereby obtaining polyhydric alcohol (s) (dimer diol and/or trimer triol). Both polyhydric alcohols thus obtained are transparent and viscous liquids at room temperature.

As another process for subjecting the dimer component and trimer component to the reducing treatment, there may also be used a catalytic reduction process with hydrogen gas. When the hydrogenation is conducted by the catalytic reduction process, Raney nickel, platinum carrying nickel diatomaceous earth, copper-chromium, copper-zinc or the like is used as a catalyst. This catalyst is added to the dimer and/or trimer component in a proportion of 0.1 to 7 mass %. With respect to reaction conditions, the reaction temperature is 100 to 300° C., preferably 250 to 280° C., the pressure of the hydrogen gas is atmospheric pressure to 300 $kg/cm^2$, preferably 150 to 250 $kg/cm^2$, and the reaction time is 1 to 15 hours, preferably 4 to 8 hours.

As examples of the polyhydric alcohols obtained in the above-described manner, may be mentioned dimer diols represented by the following general formulae (1) to (4), which are obtained by subjecting a dimer of a higher unsaturated fatty acid having 18 carbon atoms to the reducing treatment, and trimer triols obtained by reacting and bonding a dimer diol represented by the general formula (1) or (3) with and to an unsaturated aliphatic alcohol represented by the following general formula (5) or (6) at the respective unsaturated bond sites.

General formula (1):

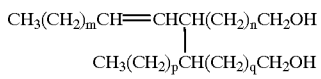

General formula (2):

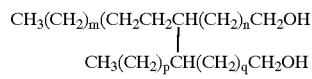

General formula (3):

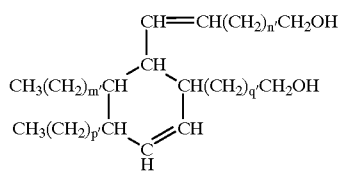

General formula (4):

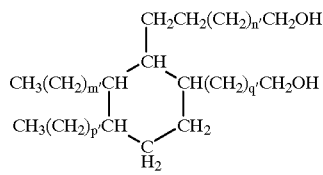

wherein m, n, p, q, m', n', p' and q' are independently 0 or an integer of 1 or greater, m+n+p+q equals 28, m+n equals m'+n'+1, and p+q equals p'+q'+3.

General formula (5):

General formula (6):

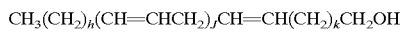

wherein t, u, h, j and k are independently 0 or an integer of 1 or greater, t+u+5 equals 18, and h+3j+k+4 equals 18.

As examples of commercially available dimer diols obtained by subjecting a dimer of a higher unsaturated fatty acid to the reducing treatment, may be mentioned "Pespole HP-1000" (product of Toagosei Chemical Industry Co., Ltd.) and "Sobamole POL908" (product of Henkel Hakusui Corporation).

The component $A^3$ as an optional component making up the component [A] is an ether compound obtained by an intermolecular dehydration reaction (condensation reaction at hydroxyl group sites) of at least one polyhydric alcohol selected from the component $A^1$ (dimer diols) and the component $A^2$ (trimer triols).

Such a component $A^3$ can be obtained, for example, by subjecting the polyhydric alcohol used as a raw material to a dehydration reaction at a temperature of 150 to 280° C. for 3 to 10 hours, preferably under reduced pressure, using an acid catalyst selected from p-toluenesulfonic acid, sulfuric acid, hydrogen fluoride, hydrogen trifluoride, methanesulfonic acid, activated clay, synthetic zeolites and the like in a proportion of 0.1 to 10 mass %, preferably 0.5 to 5 mass %, based on the polyhydric alcohol.

The component $A^4$ as an optional component making up the component [A] is an ester compound obtained by reacting at least one polyhydric alcohol selected from the component $A^1$ (dimer diols) and the component $A^2$ (trimer triols) with a carboxylic acid corresponding to the polyhydric alcohol.

The term the "carboxylic acid corresponding to the polyhydric alcohol" as used herein means a "dimer (monocarboxylic acid-monoalcohol)", "trimer (dicarboxylic acid-monoalcohol)" or "trimer (monocarboxylic acid-diol)" obtained by partially hydrogenating a dimer acid, dimer acid diester, trimer acid or trimer acid triester which is a precursor of the polyhydric alcohol.

Such a component $A^4$ can be obtained, for example, by adding, to the polyhydric alcohol as a raw material, a carboxylic acid corresponding to the polyhydric alcohol in such a manner that the hydroxyl groups contained in the former polyhydric alcohol become an equimolar amount to the carboxyl group(s) contained in the latter carboxylic acid to conduct an esterification reaction at a temperature of 50 to 150° C. for 3 to 10 hours using an acid catalyst selected from p-toluenesulfonic acid, sulfuric acid, hydrogen fluoride, hydrogen trifluoride, methanesulfonic acid and the like, or a base catalyst selected from sodium hydroxide, lithium hydroxide, metallic sodium and the like in a proportion of 0.1 to 10 mass %, preferably 0.5 to 5 mass %, based on the polyhydric alcohol.

In the component [A] obtained by subjecting a precursor of the polyhydric alcohol to the reducing treatment by the catalytic reduction process with hydrogen gas, the component $A^3$ and/or the component $A^4$ is contained in a proportion of 1 to 15 mass % based on the whole component [A] together with the polyhydric alcohol (component $A^1$ and/or component $A^2$). This content can be enhanced to 15 to 40 mass % by removing water and lower alcohol(s) secondarily produced during the reducing treatment.

The component $A^3$ and component $A^4$ are optional components making up the component [A]. When the component $A^3$ and/or the component $A^4$ is contained in the component [A], the falling ball strength (impact resistance) of a lens formed from the resulting lens material is improved, and the reduction in specific gravity of the lens material can be achieved with ease.

The total proportion of the component $A^3$ and component $A^4$ contained in the component [A] is 0 to 40 mass %, preferably 5 to 30 mass %. If this proportion exceeds 40 mass %, the viscosity of the component [A] and in its turn the monomer mixture becomes too high, so that the resulting copolymer is deteriorated in flexibility.

<Component [B]>

The component [B] used for obtaining a plastic lens material according to the present invention is an isocyanate compound-containing component composed of 50 to 100 mass % of an isocyanate compound $B^1$ (hereinafter referred to as "component $B^1$") having a radical-polymerizable unsaturated bond in its molecule and 50 to 0 mass % of a polyisocyanate compound $B^2$ (hereinafter referred to as "component $B^2$") having no radical-polymerizable unsaturated bond in its molecule.

As specific examples of the component $B^1$, may be mentioned methacryloyl isocyanate, acryloyl isocyanate, methacryloylethyl isocyanate, acryloylethyl isocyanate, methacryloxyethyl isocyanate, acryloxyethyl isocyanate, vinyldimethylbenzyl isocyanate and isopropenyldimethylbenzyl isocyanate. These compounds may be used either singly or in any combination thereof.

Besides, a reaction product obtained by a urethanation reaction of a polyisocyanate compound having 2 or 3 isocyanate groups in its molecule with a compound having at least one OH group and at least one radical-polymerizable unsaturated bond in its molecule may also be used as the component $B^1$.

As examples of the polyisocyanate compound used for obtaining the urethanation reaction product (component $B^1$), may be mentioned hexamethylene diisocyanate, octamethylene diisocyanate, isophorone diisocyanate, 2,2,4-trimethyl-hexamethylene diisocyanate, dicyclohexyl-methane diisocyanate, tetramethylene diisocyanate, tolylene diisocyanate, 4,4'-diphenylmethane diisocyanate, naphthalene diisocyanate, 3,3'-dimethyl-4,4'-bisphenylene diisocyanate, m-xylylene diisocyanate, a biuret reaction product of hexamethylene diisocyanate, isocyanate compounds of a trimer structure or their adduct reaction products with trimethylolpropane, trifunctional and tetrafunctional polyisocyanate compounds derived from isophorone diisocyanate, and 2-isocyanatoethyl-2,6-diisocyanatoethyl hexanoate. These polyisocyanate compounds may be used either singly or in any combination thereof.

As examples of the compound having at least one OH group and at least one radical-polymerizable unsaturated bond in its molecule, which is used for obtaining the urethanation reaction product (component $B^1$), may be mentioned acrylic acid, methacrylic acid, 2-hydroxyethyl acrylate, 3-hydroxypropyl acrylate, 3-hydroxypropyl methacrylate, 2,3-dihydroxypropyl acrylate, 2,3-dihydroxypropyl methacrylate, 2-hydroxybutyl acrylate, 2-hydroxybutyl methacrylate, 2-carboxyethyl acrylate, 2-carboxyethyl methacrylate, vinylbenzoic acid and 2-hydroxy-3-phenoxypropyl acrylate. These compounds may be used either singly or in any combination thereof.

The urethanation reaction for obtaining the urethanation reaction product as the component $B^1$ may be carried out in the presence of the component [A] and other component of the component [B] than the component $B^1$.

According to this process, "component $B^1$-forming reaction" and "urethanation reaction of the component [B] containing the component $B^1$ formed with the component [A]" are allowed to proceed side by side. Therefore, such a process is preferred because the production process can be simplified.

The component $B^2$ as an optional component making up the component [B] is a polyisocyanate compound having no radical-polymerizable unsaturated bond in its molecule. The incorporation of the component $B^2$ into the component [B] permits controlling the molecular weight of the reaction product of the component [B] with the component [A] within a preferred range (making the molecular weight higher).

As specific examples of such a component $B^2$, may be mentioned the polyisocyanate compounds described above as those as may be used in the reaction for forming the component $B^1$ composed of the urethanation reaction product.

The proportion of the component $B^2$ contained in the component [B] is 0 to 50 mass %. If this proportion exceeds 50 mass %, the viscosity of its reaction product with the component [A] becomes too high, so that the handling property of the reaction product is deteriorated, and moreover its compatibility with the copolymerizable monomer [C] making up the monomer mixture is lowered. Therefore, the resulting copolymer (lens material) is deteriorated in transparency, mechanical properties and heat resistance.

<Urethanation reaction of component [A] with component [B]>

The urethanation reaction of the component [A] with the component [B] can be conducted in an organic solvent inert to this reaction. After completion of the reaction, the solvent is removed, thereby obtaining a radical-polymerizable urethane compound. When the reaction system (the mixture of the component [A] and the component [B]) is in the form of a liquid, the reaction may be conducted without using any organic solvent. The urethanation reaction may be conducted in the presence of the copolymerizable monomer [C]. This process is preferred because the resultant reaction mixture can be used as the monomer mixture as it is.

The urethanation reaction of the component [A] with the component [B] may be conducted by heating the reaction system. However, a proper catalyst for the urethanation reaction is generally used from the viewpoint of shortening reaction time. As examples of such a catalyst, may be mentioned di-n-butyltin laurate, stannous octoate, dimethyltin dichloride and stannic chloride.

Proportions of the component [A] and the component [B] used in the urethanation reaction must be such that assuming that the number of moles of hydroxyl groups contained in the component [A] and the number of moles of an isocyanate group contained in the component [B] are a and b, respectively, a molar ratio (b/a) amounts to 0.5 to 3.0. If this molar ratio is lower than 0.5, the resulting copolymer is too opaque to satisfy optical properties required of lenses. If the ratio exceeds 3.0 on the other hand, the resulting copolymer is deteriorated in weather resistance and stability.

It is preferred that a monohydric aliphatic alcohol having at least 6 carbon atoms should be contained in the reaction system. A reaction product obtained by using such an aliphatic alcohol in combination has enhanced compatibility with the copolymerizable monomer [C] making up the monomer mixture, whereby optical properties of the resulting copolymer can be more enhanced. As specific examples of such a monohydric aliphatic alcohol, may be mentioned lauryl alcohol, myristyl alcohol, palmityl alcohol and stearyl alcohol. These alcohols may be used either singly or in any combination thereof. The proportion of the aliphatic alcohol to be used is at most 40 mass % based on all the alcohol components from the viewpoint of retaining good mechanical properties of the resulting copolymer.

<Copolymerizable monomer [C]>

No particular limitation is imposed on the copolymerizable monomer [C] making up the monomer mixture together with the radical-polymerizable urethane compound, which is a reaction product of the component [A] with the component [B], so far as it is a compound copolymerizable with the reaction product. Examples thereof may include compounds having at least one acryloyl group, methacryloyl group, vinyl group or the like in their molecules.

As examples of the compounds having at least one acryloyl group or methacryloyl group in their molecules, may be mentioned (meth)acrylates having an aliphatic alkyl group, such as methyl (meth)acrylate, ethyl (meth)acrylate, butyl (meth)acrylate, isobutyl (meth)acrylate, t-butyl (meth) acrylate, n-hexyl (meth)acrylate and isostearyl (meth) acrylate; (meth)acrylates having an aromatic or alicyclic group, such as phenyl (meth)acrylate, cyclohexyl (meth) acrylate, naphthyl (meth)acrylate and 1,2,3-tribromophenyl (meth)acrylate; multifunctional (meth)-acrylates such as stearyl di(meth)acrylate, ethylene glycol di(meth)acrylate, polyethylene glycol poly(meth)-acrylate, propylene glycol di(meth)acrylate, butylene glycol di(meth)acrylate, neopentyl glycol di(meth)acrylate, 1,6-hexanediol di(meth) acrylate, 1,9-nonanediol di(meth)-acrylate, trimethylolpropane tri(meth)acrylate, tetramethylolmethane tri(meth) acrylate, tetramethylol-methane tetra(meth)acrylate, 2,2-bis [4-(meth)acryloxy-ethoxyphenyl]propane and 2,2-bis[4-(meth)acryloxy-polyethoxyphenyl]propane; and ester compounds obtained by reacting at least one polyhydric alcohol selected from the component $A^1$ and the component $A^2$ with at least one acid selected from acrylic acid and methacrylic acid. These compounds may be used either singly or in any combination thereof. In the above-mentioned compounds, the term "(meth)acrylate" means each of "acrylate" and "methacrylate".

The compounds having at least one vinyl group in its molecule are preferably aromatic vinyl compounds having an aromatic ring because a copolymer having a high refractive index can be provided.

As examples of such an aromatic vinyl compound, may be mentioned styrene, t-butylstyrene, α-methylstyrene, divinylbenzene, 4-chlorostyrene, chloromethylstyrene, 4-hydroxymethylstyrene, ethylstyrene, o-methylstyrene and 4-methoxystyrene. These compounds may be used either singly or in any combination thereof.

Of the above-mentioned compounds, t-butyl (meth) acrylate, isostearyl (meth)acrylate, stearyl di(meth)acrylate, styrene, t-butylstyrene, α-methylstyrene and divinylbenzene are preferred.

The compound used as the copolymerizable monomer [C] is not limited to the above compounds. It is however preferable to select the kind of the copolymerizable monomer [C] in such a manner that the resulting copolymer has a specific gravity of 0.90 to 1.20, preferably 0.90 to 1.10 and a refractive index of 1.45 to 1.60.

<Monomer mixture>

The monomer mixture subjected to a radical polymerization reaction in the present invention is composed of the radical-polymerizable urethane compound, which is a reaction product of the component [A] with the component [B], and the copolymerizable monomer [C]. The proportions of both components in the monomer mixture are controlled in such a manner that a mass ratio of "the radical-polymerizable urethane compound to the copolymerizable monomer [C]" is generally 20:80 to 80:20, preferably 30:70 to 70:30. If the proportion of the radical-polymerizable urethane compound is lower than 20 mass %, it is extremely difficult to obtain a copolymer having a low specific gravity (for example, a copolymer having a specific gravity of 1.20 or lower). If this proportion exceeds 80 mass % on the other hand, the resulting copolymer fails to have good mechanical properties.

The monomer mixture may also contain an antistatic agent, colorant, ultraviolet absorbent, heat stabilizer, antioxidant, filler and/or the like as needed.

The monomer mixture as described above is polymerized, thereby obtaining a copolymer which constitutes the plastic lens material according to the present invention. The polymerization reaction mechanism may include radical polymerization, ionic polymerization, photopolymerization and the like. A process making use of a conventional radical polymerization initiator or photopolymerization initiator is preferred. For example, the radical polymerization may be conducted using a radical polymerization initiator capable of initiating a polymerization reaction at a temperature of 30 to 120° C. Besides, the photopolymerization may be conducted at room temperature or so utilizing light from a high pressure mercury lamp or low pressure mercury lamp.

In the present invention, the radical-polymerizable urethane compound making up the monomer mixture is a multifunctional monomer. Therefore, a crosslinked structure is introduced into the copolymer obtained from the monomer mixture. It is hence difficult to use this copolymer in a molding or forming process which involves dissolving or melting of the copolymer. Accordingly, it is preferable to apply a cast polymerization process, by which an intended form of a lens can be directly given, to the monomer mixture as a polymerization process thereof.

A casting mold or frame in the form of a plate, lens, cylinder, square pillar, cone, sphere or the like, which has been designed according to the intended end and application of the resulting copolymer, is used as a vessel for the cast polymerization. The material of the vessel can be optionally selected from inorganic glass, plastics, metals, etc. as necessary for the end intended. The polymerization reaction can be practically performed by charging the monomer mixture containing a polymerization initiator into the vessel for cast polymerization and then heating it. However, it is also possible to conduct the polymerization reaction by allowing the monomer mixture to react to a certain degree in advance in another reaction vessel and then pouring the resultant prepolymer or syrup having an increased viscosity into the vessel for the cast polymerization to complete polymerization.

Besides, a forming process in which a copolymer in the form of a plate or block is formed by the cast polymerization, and a lens in a form intended is skived from the copolymer may also be adopted.

The molded or formed product (lens material) obtained in the above-described manner may also be subjected to a surface-polishing treatment, an antistatic treatment, a surface-coating treatment with a suitable organic or inorganic material, and/or the like as needed.

BEST MODE FOR CARRYING OUT THE INVENTION

The present invention will hereinafter be described by the following examples. However, the present invention is not limited to and by these examples.

Incidentally, charged amounts upon polymerization in the following examples mean amounts of pure substances unless expressly noted. All designations of "%" except for % used for light transmittance, and "part" or "parts" as will be used in the following examples mean "mass %" and "part or parts by mass", respectively.

The various performance characteristics of the lens materials obtained in the following examples and comparative examples were evaluated in the following manner:

(1) Transparency: evaluated by measuring the transmittance of visible rays in accordance with JIS K 7105.
(2) Refractive index: evaluated by measuring a refractive index at 20° C. by an Abbe's refractometer.
(3) Specific gravity: measured in accordance with ASTM D 792.
(4) Impact resistance: tested whether a specimen (lens) is broken or not when a steel ball 16.33 g in weight is allowed to fall on the specimen from a height of 127 cm in accordance with the U.S. FDA standard.

PREPARATION EXAMPLE 1

One thousand grams of a mixture of higher unsaturated fatty acid methyl esters, which contained 72% of methyl oleate, 18% of methyl linoleate and 10% of a higher saturated fatty acid methyl ester, were allowed to react at 230° C. for 5 hours in the presence of 70 g of activated clay in a nitrogen atmosphere in a 2-liter autoclave. An unreacted higher unsaturated fatty acid methyl ester fraction and an isomerized higher unsaturated fatty acid methyl ester fraction were removed from the resultant reaction mixture by vacuum distillation (230° C./1 Torr), and the residue was then subjected to molecular distillation (280° C./0.1 Torr) to obtain about 450 g of dimer acid dimethyl esters.

Thereafter, 12 g (a proportion of 3% based on the dimer acid dimethyl esters) of a copper-chromium catalyst were added to 400 g of the thus-obtained dimer acid dimethyl esters to hydrogenate the esters over 10 hours by a catalytic reduction process while introducing hydrogen gas for 10 minutes every 3 hours under conditions of a hydrogen gas pressure of 220 kg/cm$^2$ and a temperature of 270° C., thereby obtaining 340 g of a mixture [hereinafter designated Component (A-1)] composed of 85% of dimer diols (component $A^1$), 12% of ether compounds (component $A^3$) formed by the intermolecular dehydration reaction of the dimer diols, and 3% of ester compounds (component $A^4$) of the dimer diols with their corresponding carboxylic acids.

PREPARATION EXAMPLE 2

Two hundred grams of Component (A-1) obtained in Preparation Example 1 were subjected to molecular distillation (250° C./0.1 Torr), thereby obtaining 160 g of substantially pure dimer diols (component $A^1$; hydroxyl number: 199 KOH mg/g) [hereinafter designated Component (A-2)].

PREPARATION EXAMPLE 3

To 100 g of Component (A-2) obtained in Preparation Example 2 were added 2 g of acid activated clay to conduct a dehydration reaction for 10 hours at 200° C. in a nitrogen atmosphere. After completion of the reaction, the activated clay was removed by filtration from the resultant reaction mixture, and the residue was subjected to molecular distillation, thereby removing unreacted dimer diols (component $A^1$) to obtain 75 g of ether compounds (component $A^3$; hydroxyl number: 103 KOH mg/g) formed by the intermolecular dehydration reaction of the dimer diols. The component $A^1$ and the component $A^3$ were mixed in a proportion to give a molar ratio of 90:10 to obtain a mixture [hereinafter designated Component (A-3)].

PREPARATION EXAMPLE 4

One thousand grams of a mixture of higher unsaturated fatty acid esters, which contained 75% of methyl oleate, 15% of methyl linoleate and 9% of methyl stearate, were allowed to react at 230° C. for 5 hours in the presence of 70 g of montmorillonite type activated clay in a nitrogen atmosphere in a 2-liter autoclave. After the catalyst was removed by filtration from the reaction mixture, the reaction mixture was subjected to molecular distillation to remove a monomer fraction distilled out in a temperature range of from 200 to 220° C. under a pressure of 0.3 to 0.5 mmHg, thereby obtaining about 450 g of dimer acid dimethyl esters and about 150 g of trimer acid trimethyl esters. These dimer acid dimethyl esters and trimer acid trimethyl esters were mixed in amounts of 200 g and 50 g, respectively, to prepare a liquid mixture containing both components at a mixing ratio of 80:20. This mixture in an amount of 250 g was diluted with 350 ml of diethyl ether to prepare a dilute liquid mixture.

On the other hand, after purging the interior of a reactor equipped with a stirrer, condenser tube, thermometer, dropping funnel and nitrogen gas inlet tube with nitrogen gas, 32 g of lithium aluminum hydride were charged into the reactor. While stirring the contents at room temperature in a nitrogen gas atmosphere, 1,200 ml of diethyl ether were gradually added into the reactor through the dropping funnel, thereby obtaining a dispersion of lithium aluminum hydride.

The dilute liquid mixture prepared above was added dropwise to this dispersion over about 2 hours, thereby conducting a reaction. All the while, the temperature of the reaction system was kept at about 30° C. After completion of the addition, the reaction system was left to stand for 30 minutes, and 65 g of water were then gradually added dropwise through the dropping funnel. The reaction mixture thus obtained was slowly transferred into a beaker containing 350 g of ice, and 250 g of a 10% aqueous solution of sulfuric acid were then added to the beaker. A proper amount of diethyl ether was further added to take an ether layer out of the beaker.

The ether layer thus recovered was then washed with water until waste water became neutral. The solvent in the ether layer thus washed was distilled off under reduced pressure, thereby obtaining 210 g of a mixture [hereinafter designated Component (A-4)] of 80% of dimer diols (component $A^1$) and 20% of trimer triols (component $A^2$). This Component (A-4) was a transparent and viscous liquid and had a hydroxyl number of 190 KOH mg/g.

PREPARATION EXAMPLE 5

A reactor equipped with a stirrer, nitrogen gas inlet tube, thermometer, condenser tube and water-measuring tube was charged with 21.0 g of Component (A-4) obtained in Preparation Example 4, 7.4 g of methacrylic acid, 0.015 g of p-methoxyphenol, 1.42 g of p-toluene-sulfonic acid and 12 g of cyclohexane. The contents were heated to about 90° C. while introducing a small amount of air therein and stirring them. While removing formed water outside the system of reaction through the water-measuring tube in a state kept at this temperature, an esterification reaction was conducted for about 6 hours until the amount of the formed water amounted to 1.4 g.

After the resulting reaction product was then cooled, it was dissolved in 18 g of diethyl ether. The resultant solution was neutralized with 3.5 g of a 10% aqueous solution of sodium hydroxide to separate and remove a water layer.

After an ether layer was then washed with water until waste water became neutral, 0.015 g of p-methoxy-phenol were added. The solvent was removed from the ether layer by vacuum distillation, thereby obtaining 23.7 g of a mixture [hereinafter designated Component (C-1)] of the methacrylic esters of polyhydric alcohols. This Component (C-1) was analyzed by liquid chromatography. As a result, it was confirmed that a mass ratio of the dimer diol methacrylate to the trimer triol methacrylate was 80:20.

EXAMPLE 1

(1) Synthesis of radical-polymerizable urethane compound:

A mixture composed of 18.8 parts of 2-methacryloxy-ethyl isocyanate (component $B^1$), 20 parts of styrene and 0.01 parts of di-n-butyltin laurate (catalyst for urethanation reaction) was heated to 55° C. with stirring in accordance with its corresponding formulation shown in the following Table 1. To this mixture, 31.2 parts of Component (A-2) obtained in Preparation Example 2 and 20 parts of styrene were gradually added dropwise over 60 minutes. In the resultant mixture, mixing proportions of the component $B^1$ and Component (A-2) were such that a ratio (b/a) of the number (b) of moles of the isocyanate group contained in the component $B^1$ to the number (a) of moles of the hydroxyl groups contained in Component (A-2) is 1.0. After completion of the addition, the mixture was kept at 55° C. for 60 minutes, thereby completing a urethanation reaction to prepare a mixture of a radical-polymerizable urethane compound and styrene.

(2) Radical polymerization (cast polymerization):

Ten parts of divinylbenzene and 1.0 part of lauroyl peroxide (radical polymerization initiator) were further added to and mixed into the mixture of the radical-polymerizable urethane compound and styrene obtained in the step (1) to prepare a monomer mixture.

This monomer mixture was cast into a glass-made mold for a lens and successively heated at different temperatures, i.e., 50° C. for 10 hours, 60° C. for 8 hours, 80° C. for 3 hours and 100° C. for 2 hours to conduct polymerization, thereby producing a lens of −2.00 diopter.

(3) Performance evaluation:

This lens was excellent in transparency as demonstrated by a transmittance of visible rays of 91.5%, and had a refractive index as high as 1.517 and a specific gravity as extremely low as 1.044. Besides, its impact resistant test revealed that no breakage was observed, and the lens hence had good mechanical properties.

EXAMPLES 2 to 5

Syntheses of radical-polymerizable urethane compounds and radical polymerization were conducted in the same manner as in Example 1 except that the compositions of mixtures containing the component [B], and the kinds and amounts of the component [A] added dropwise to the mixtures were changed in accordance with their corresponding formulations shown in Table 1, thereby producing lenses. The results of the performance evaluation of the lenses thus obtained are shown collectively in Table 1. From the results shown in Table 1, it is understood that the lenses obtained by Examples 2 to 5 are all excellent in transparency, high in refractive index, low in specific gravity and also excellent in mechanical properties.

COMPARATIVE EXAMPLE 1

Synthesis of a urethane compound and polymerization were conducted in the same manner as in Example 1 except that the composition of a mixture containing the component [B], and the kind and amount of Component (A-2) added dropwise to the mixture were changed in accordance with its corresponding formulation shown in Table 1, thereby producing a lens. The thus-obtained lens was opaque and hence did not satisfy optical properties required of lenses. The lens was easily deformed by the force of fingers and hence did not have sufficient mechanical properties. This reason is considered to be attributable to the fact that the urethane compound formed from Component (A-2) and the component $B^2$ has no radical-polymerizable unsaturated bond, and so the compatibility of the urethane compound with styrene and divinylbenzene is deteriorated.

COMPARATIVE EXAMPLE 2

Synthesis of a radical-polymerizable urethane compound and radical polymerization were conducted in the same manner as in Example 2 except that the amount of the component [B] used and the amount of the component [A] added dropwise were changed in accordance with its corresponding formulation shown in Table 1, thereby producing a lens. The thus-obtained lens was opaque and hence did not satisfy optical properties required of lenses. This reason is considered to be attributable to a molar ratio (b/a) as too low as 0.44.

TABLE 1

| | | Ex. 1 | Ex. 2 | Ex. 3 | Ex. 4 | Ex. 5 | Comp. Ex. 1 | Comp. Ex. 2 |
|---|---|---|---|---|---|---|---|---|
| I | 2-Methacryloxy-ethyl isocyanate (component $B^1$) | 18.8 | — | — | — | — | — | — |
| | m-Isopropenyl-dimethylbenzyl isocyanate (component $B^1$) | — | 30.0 | 26.0 | 22.0 | 16.0 | — | 11.0 |
| | Methylenebis-phenyl isocyanate (component $B^2$) | — | — | — | — | — | 15.4 | — |
| | Styrene | 20.0 | 20.0 | 20.0 | 20.0 | 20.0 | 20.0 | 20.0 |
| | Di-n-butyltin laurate | 0.01 | 0.01 | 0.01 | 0.01 | 0.01 | 0.01 | 0.01 |
| II | Component (A-2) [$A^1$ = 100] | 31.2 | — | — | — | — | 34.6 | — |
| | Component (A-1) [$A^1:A^3:A^4$ = 85:12:3] | — | 20.0 | 24.0 | 28.0 | 34.0 | — | 39.0 |
| | Styrene | 20.0 | 20.0 | 20.0 | 20.0. | 20.0 | 20.0 | 20.0 |
| | Divinylbenzene | 10.0 | 10.0 | 10.0 | 10.0 | 10.0 | 10.0 | 10.0 |
| | b/a [(NCO)/(OH)] | 1.0 | 2.32 | 1.68 | 1.22 | 0.72 | 1.0 | 0.44 |
| | Transmittance of visible rays (%) | 91.5 | 91.8 | 91.0 | 90.8 | 90.2 | Opaque | Opague |
| | Refractive index | 1.517 | 1.566 | 1.562 | 1.562 | 1.557 | — | — |
| | Specific gravity | 1.044 | 1.055 | 1.046 | 1.039 | 1.028 | — | — |
| | Impact resistance (broken or not) | None | None | None | None | None | — | — |

I: Mixture containing the component [B]
II: Component added dropwise

EXAMPLES 6 to 8

Syntheses of radical-polymerizable urethane compounds and radical polymerization were conducted in the same manner as in Example 1 except that the compositions of mixtures containing the component [B], the kinds and amounts of the component [A] added dropwise, the amount of styrene added dropwise, and the amount of divinylbenzene used were changed in accordance with their corresponding formulations shown in Table 2, thereby producing lenses. The results of the performance evaluation of the lenses thus obtained are shown collectively in Table 2. From the results shown in Table 2, it is understood that the lenses obtained by Examples 6 to 8 are all excellent in transparency, high in refractive index, low in specific gravity and also excellent in mechanical properties.

TABLE 2

|  |  | Ex. 6 | Ex. 7 | Ex. 8 |
|---|---|---|---|---|
| I | m-Isopropenyldimethylbenzyl isocyanate (component $B^1$) | 8.6 | — | 5.5 |
|  | Methylenebisphenyl isocyanate (component $B^2$) | 5.4 | — | — |
|  | Isocyanate compound having a radical-polymerizable unsaturated bond *1 (component $B^1$) | — | 23.0 | — |
|  | Cyclic trimer of hexamethylene diisocyanate (component $B^2$) | — | — | 16.3 |
|  | 2-Hydroxybutyl methacrylate | — | — | 4.3 |
|  | Isostearyl alcohol | — | — | 7.4 |
|  | Styrene | 15.0 | 15.0 | 15.0 |
|  | Stearyl dimethacrylate | 22.0 | 22.0 | — |
|  | Isostearyl methacrylate | — | — | 12.0 |
|  | Di-n-butyltin laurate | 0.1 | 0.1 | 0.1 |
| II | Component (A-3) [$A^1:A^3$ = 90:10] | 26.0 | 17.0 | 16.5 |
|  | Styrene | 16.0 | 16.0 | 16.0 |
| Divinylbenzene |  | 7.0 | 7.0 | 7.0 |
| b/a [(NCO)/(OH)] |  | 1.0 | 1.0 | 1.0 |
| Transmittance of visible rays (%) |  | 91.3 | 91.0 | 91.9 |
| Refractive index |  | 1.545 | 1.549 | 1.537 |
| Specific gravity |  | 1.030 | 1.069 | 1.035 |
| Impact resistance (broken or not) |  | None | None | None |

*1: A urethanation reaction product of 10.6 parts of m-xylylene diisocyanate with 12.4 parts of 2-hydroxy-3-phenoxypropyl acrylate.
I: Mixture containing the component [B]
II: Component added dropwise

EXAMPLES 9 to 12

Syntheses of radical-polymerizable urethane compounds and radical polymerization were conducted in the same manner as in Example 1 except that the compositions of mixtures containing the component [B], the kinds and amounts of the component [A] added dropwise, the amount of styrene added dropwise, and the amount of divinylbenzene used were changed in accordance with their corresponding formulations shown in Table 3, thereby producing lenses. The results of the performance evaluation of the lenses thus obtained are shown collectively in Table 3. From the results shown in Table 3, it is understood that the lenses obtained by Examples 9 to 12 are all excellent in transparency, high in refractive index, low in specific gravity and also excellent in mechanical properties.

EXAMPLE 13

Synthesis of a radical-polymerizable urethane compound and radical polymerization were conducted in the same manner as in Example 9 except that 16.0 parts of t-butyl methacrylate were used in place of styrene making up the mixture containing the component [B], and 15.0 parts of t-butyl methacrylate were used in place of styrene making up the dropwise adding component in accordance with its corresponding formulation shown in Table 3, thereby producing a lens. The results of the performance evaluation of the lens thus obtained are shown collectively in Table 3. From the results shown in Table 3, it is understood that the lens obtained by Example 13 is excellent in transparency, high in refractive index, low in specific gravity and also excellent in mechanical properties.

TABLE 3

|  |  | Ex. 9 | Ex. 10 | Ex. 11 | Ex. 12 | Ex. 13 |
|---|---|---|---|---|---|---|
| I | m-Isopropenyldimethylbenzyl isocyanate (component $B^1$) | 16.0 | 20.0 | 24.0 | 16.0 | 16.0 |
|  | Styrene | 16.0 | 14.0 | 12.0 | 10.0 | — |
|  | t-Butyl methacrylate | — | — | — | — | 16.0 |
|  | Stearyl dimethacrylate | 22.0 | 16.0 | 10.0 | — | 22.0 |
|  | Component (C-1) [mixture of methacrylic esters of polyhydric alcohols] | — | — | — | 33.0 | — |
|  | Di-n-butyltin laurate | 0.1 | 0.1 | 0.1 | 0.1 | 0.1 |
| II | Component (A-4) [$A^1:A^2$ = 80:20] | 24.0 | 30.0 | 36.0 | 24.0 | 24.0 |
|  | Styrene | 15.0 | 13.0 | 11.0 | 10.0 | — |
|  | t-Butyl methacrylate | — | — | — | — | 15.0 |
| Divinylbenzene |  | 7.0 | 7.0 | 7.0 | 7.0 | 7.0 |
| b/a [(NCO)/(OH)] |  | 1.0 | 1.0 | 1.0 | 1.0 | 1.0 |
| Transmittance of visible rays (%) |  | 91.2 | 90.9 | 91.0 | 91.1 | 90.9 |
| Refractive index |  | 1.544 | 1.544 | 1.545 | 1.536 | 1.517 |
| Specific gravity |  | 1.021 | 1.024 | 1.028 | 1.013 | 1.009 |
| Impact resistance (broken or not) |  | None | None | None | None | None |

I: Mixture containing the component [B]
II: Component added dropwise

EXAMPLE 14

Polymerization was conducted in the same manner as in Example 9 except that 23.7 parts of a dimer diol (Pespole HP-1000; hydroxyl number: 196 KOH mg/g) produced by Toagosei Chemical Industry Co., Ltd. were used as the component [A], and the amount of the component $B^1$ used was changed from 16.0 parts to 16.3 parts [molar ratio (b/a)=1.0], thereby producing a lens. The performance of the lens thus obtained was as follows. Namely, the specific gravity was as low as 1.022, the refractive index was as high as 1.545, and its transparency was also excellent as demonstrated by a transmittance of visible rays of 91.8%. Besides, it was not broken in the impact resistant test, and its stiffness was also sufficient.

EXAMPLE 15

A mixture composed of 21.5 parts of m-isopropenyl-dimethylbenzyl isocyanate (component $B^1$), 20 parts of p-t-butylstyrene (copolymerizable monomer [C]) and 0.01 parts of di-n-butyltin laurate (catalyst for urethanation reaction) was heated to 55° C. with stirring. To this mixture, 28.5 parts of a dimer diol (Sobamole POL908; hydroxyl number: 205 KOH mg/g) produced by Henkel Hakusui Corporation) as a component [A] and 20 parts of p-t-butylstyrene (copolymerizable monomer [C]) were gradually added dropwise over 60 minutes. In the resultant mixture, mixing proportions of the component $B^1$ and the component [A] are such that a ratio (b/a) is 1.0. After completion of the addition, the mixture was kept at 55° C. for 60 minutes, thereby completing a urethanation reaction to prepare a mixture of a radical-polymerizable urethane compound and p-t-butylstyrene.

Polymerization was conducted in the same manner as in Example 1 except that 10 parts of divinylbenzene (copolymerizable monomer [C]) and 1.0 part of lauroyl peroxide (radical polymerization initiator) were further added to and mixed into the thus-obtained mixture of the radical-polymerizable urethane compound and p-t-butyl-styrene to prepare a monomer mixture, and this monomer mixture was used, thereby producing a lens. The thus-obtained lens was excellent in transparency as demonstrated by a transmittance of visible rays of 91.5%, and had a refractive index as high as 1.543 and a specific gravity as extremely low as 0.998. Besides, its impact resistant test revealed that no breakage was observed, and the lens hence had good mechanical properties.

EFFECTS OF THE INVENTION

Since the plastic lens materials according to the present invention comprise a copolymer obtained by radical-polymerizing a reaction product of the component [A] containing the polyhydric alcohol derived from the specific higher unsaturated fatty acid with the component [B] containing the isocyanate compound having a radical-polymerizable unsaturated bond in its molecule, together with a monomer copolymerizable therewith, the lens materials are excellent in transparency and high in refractive index and have suitable optical properties required of optical lenses. In addition, they are excellent in mechanical properties such as impact resistance and stiffness and have a low specific gravity, so that they can contribute sufficiently to reduction in the weight of lenses.

According to the production processes according to the present invention, plastic lens materials having excellent various properties as described above can be produced with certainty.

What is claimed is:

1. A plastic lens material comprising a copolymer obtained by polymerizing a monomer mixture comprising:
   20 to 80 mass % of a reaction product obtained by subjecting the following component [A] and the following component [B] to a urethanation reaction in proportions that a ratio (b/a) of the number (b) of moles of an isocyanate group contained in the component [B] to the number (a) of moles of hydroxyl groups contained in the component [A] amounts to 0.5 to 3.0; and
   80 to 20 mass % of a monomer copolymerizable with the reaction product;
   Component [A]:
      a polyhydric alcohol-containing component composed of 60 to 100 mass % of at least one polyhydric alcohol selected from the following component $A^1$ and the following component $A^2$, and 40 to 0 mass % of at least one compound selected from the following component $A^3$ and the following component $A^4$;
      [Component $A^1$]: at least one diol selected from a dimer diol obtained by subjecting a dimer of a higher unsaturated fatty acid having 11 to 22 carbon atoms to a reducing treatment, and a dimer diol obtained by subjecting a dimer of a lower alcohol ester of a higher unsaturated fatty acid having 11 to 22 carbon atoms to a reducing treatment;
      [Component $A^2$]: at least one triol selected from a trimer triol obtained by subjecting a trimer of a higher unsaturated fatty acid having 11 to 22 carbon atoms to a reducing treatment, and a trimer triol obtained by subjecting a trimer of a lower alcohol ester of a higher unsaturated fatty acid having 11 to 22 carbon atoms to a reducing treatment;
      [Component $A^3$]: an ether compound obtained by an intermolecular dehydration reaction of at least one polyhydric alcohol selected from the component $A^1$ and the component $A^2$;
      [Component $A^4$]: an ester compound obtained by reacting at least one polyhydric alcohol selected from the component $A^1$ and the component $A^2$ with a carboxylic acid corresponding to the polyhydric alcohol; and
   Component [B]:
      an isocyanate compound-containing component composed of 50 to 100 mass % of an isocyanate compound $B^1$ having a radical-polymerizable unsaturated bond in its molecule and 50 to 0 mass % of a polyisocyanate compound $B^2$ having no radical-polymerizable unsaturated bond in its molecule.

2. The plastic lens material according to claim 1, which comprises a copolymer obtained by polymerizing a monomer mixture comprising 30 to 70 mass % of the reaction product obtained by subjecting the component [A] and the component [B] to the urethanation reaction, and 70 to 30 mass % of the monomer copolymerizable with the reaction product.

3. The plastic lens material according to claim 1, wherein the component $A^1$ is at least one diol selected from a dimer diol obtained by subjecting a dimer of a higher unsaturated fatty acid having 14 to 20 carbon atoms to a reducing treatment, and a dimer diol obtained by subjecting a dimer of a lower alcohol ester of a higher unsaturated fatty acid having 14 to 20 carbon atoms to a reducing treatment.

4. The plastic lens material according to claim 1, wherein the component $A^1$ is at least one diol selected from a dimer diol obtained by subjecting a dimer of a higher unsaturated fatty acid having 16 to 18 carbon atoms to a reducing treatment, and a dimer diol obtained by subjecting a dimer of a lower alcohol ester of a higher unsaturated fatty acid having 16 to 18 carbon atoms to a reducing treatment.

5. The plastic lens material according to claim 1, wherein the component $A^2$ is at least one triol selected from a trimer triol obtained by subjecting a trimer of a higher unsaturated fatty acid having 14 to 20 carbon atoms to a reducing treatment, and a trimer triol obtained by subjecting a trimer of a lower alcohol ester of a higher unsaturated fatty acid having 14 to 20 carbon atoms to a reducing treatment.

6. The plastic lens material according to claim 1, wherein the component $A^2$ is at least one triol selected from a trimer triol obtained by subjecting a trimer of a higher unsaturated fatty acid having 16 to 18 carbon atoms to a reducing treatment, and a trimer triol obtained by subjecting a trimer of a lower alcohol ester of a higher unsaturated fatty acid having 16 to 18 carbon atoms to a reducing treatment.

7. The plastic lens material according to claim 1, wherein the total proportion of the component $A^3$ and the component $A^4$ contained in the component [A] is 5 to 30 mass %.

8. The plastic lens material according to claim 1, wherein the copolymerizable monomer is a compound having at least one selected from an acryloyl group, methacryloyl group and vinyl group in its molecule.

9. The plastic lens material according to claim 1, wherein the copolymerizable monomer is at least one selected from t-butyl (meth)acrylate, isostearyl (meth)acrylate, stearyl di(meth)acrylate, styrene, t-butylstyrene, α-methylstyrene and divinylbenzene.

10. A process for producing a plastic lens material, comprising:
    subjecting the following component [A] and the following component [B] to a urethanation reaction in proportions that a ratio (b/a) of the number (b) of moles of an isocyanate group contained in the component [B] to the number (a) of moles of hydroxyl groups contained in the component [A] amounts to 0.5 to 3.0 to obtain a reaction product;
    mixing 20 to 80 mass % of the thus-obtained reaction product with 80 to 20 mass % of a monomer copolymerizable with the reaction product to prepare a monomer mixture; and
    radical-polymerizing the monomer mixture;
    Component [A]:
        a polyhydric alcohol-containing component composed of 60 to 100 mass % of at least one polyhydric alcohol selected from the following component $A^1$ and the following component $A^2$, and 40 to 0 mass % of at least one compound selected from the following component $A^3$ and the following component $A^4$,
        [Component $A^1$]: at least one diol selected from a dimer diol obtained by subjecting a dimer of a higher unsaturated fatty acid having 11 to 22 carbon atoms to a reducing treatment, and a dimer diol obtained by subjecting a dimer of a lower alcohol ester of a higher unsaturated fatty acid having 11 to 22 carbon atoms to a reducing treatment;
        [Component $A^2$]: at least one triol selected from a trimer triol obtained by subjecting a trimer of a higher unsaturated fatty acid having 11 to 22 carbon atoms to a reducing treatment, and a trimer triol obtained by subjecting a trimer of a lower alcohol ester of a higher unsaturated fatty acid having 11 to 22 carbon atoms to a reducing treatment;
        [Component $A^3$]: an ether compound obtained by an intermolecular dehydration reaction of at least one polyhydric alcohol selected from the component $A^1$ and the component $A^2$;
        [Component $A^4$]: an ester compound obtained by reacting at least one polyhydric alcohol selected from the component $A^1$ and the component $A^2$ with a carboxylic acid corresponding to the polyhydric alcohol; and
    Component [B]:
        an isocyanate compound-containing component composed of 50 to 100 mass % of an isocyanate compound $B^1$ having a radical-polymerizable unsaturated bond in its molecule and 50 to 0 mass % of a polyisocyanate compound $B^2$ having no radical-polymerizable unsaturated bond in its molecule.

11. The production process of the plastic lens material according to claim 10, which comprises mixing 30 to 70 mass % of the reaction product obtained by subjecting the component [A] and the component [B] to the urethanation reaction with 70 to 30 mass % of the monomer copolymerizable with the reaction product to prepare a monomer mixture, and radical-polymerizing the monomer mixture.

12. The production process of the plastic lens material according to claim 10, wherein the component $A^1$ is at least one diol selected from a dimer diol obtained by subjecting a dimer of a higher unsaturated fatty acid having 14 to 20 carbon atoms to a reducing treatment, and a dimer diol obtained by subjecting a dimer of a lower alcohol ester of a higher unsaturated fatty acid having 14 to 20 carbon atoms to a reducing treatment.

13. The production process of the plastic lens material according to claim 10, wherein the component $A^1$ is at least one diol selected from a dimer diol obtained by subjecting a dimer of a higher unsaturated fatty acid having 16 to 18 carbon atoms to a reducing treatment, and a dimer diol obtained by subjecting a dimer of a lower alcohol ester of a higher unsaturated fatty acid having 16 to 18 carbon atoms to a reducing treatment.

14. The production process of the plastic lens material according to claim 10, wherein the component $A^2$ is at least one triol selected from a trimer triol obtained by subjecting a trimer of a higher unsaturated fatty acid having 14 to 20 carbon atoms to a reducing treatment, and a trimer triol obtained by subjecting a trimer of a lower alcohol ester of a higher unsaturated fatty acid having 14 to 20 carbon atoms to a reducing treatment.

15. The production process of the plastic lens material according to claim 10, wherein the component $A^2$ is at least one triol selected from a trimer triol obtained by subjecting a trimer of a higher unsaturated fatty acid having 16 to 18 carbon atoms to a reducing treatment, and a trimer triol obtained by subjecting a trimer of a lower alcohol ester of a higher unsaturated fatty acid having 16 to 18 carbon atoms to a reducing treatment.

16. The production process of the plastic lens material according to claim 10, wherein the total proportion of the component $A^3$ and the component $A^4$ contained in the component [A] is 5 to 30 mass %.

17. The production process of the plastic lens material according to claim 10, wherein the copolymerizable monomer is a compound having at least one selected from an acryloyl group, methacryloyl group and vinyl group in its molecule.

18. The production process of the plastic lens material according to claim 10, wherein the copolymerizable monomer is at least one selected from t-butyl (meth)acrylate, isostearyl (meth)acrylate, stearyl di(meth)acrylate, styrene, t-butylstyrene, α-methylstyrene and divinylbenzene.

19. The production process of the plastic lens material according to claim 10, which comprises subjecting the component [A] and the component [B] to the urethanation reaction in the presence of the copolymerizable monomer.

20. The production process of the plastic lens material according to claim 10, wherein a monohydric aliphatic alcohol having at least 6 carbon atoms is contained in the reaction system of the urethanation reaction.

* * * * *